(12) United States Patent  (10) Patent No.: US 8,563,894 B2
Battheu                     (45) Date of Patent:     Oct. 22, 2013

(54) COMBINED MACHINE FOR PUNCHING AND LASER CUTTING OF FLAT SHEET METAL

(75) Inventor: Claude Battheu, Bolzano (IT)

(73) Assignee: Salvagnini Italia S.p.A., Sarego Vi (IT)

( * ) Notice: Subject to any disclaimer, the term of this patent is extended or adjusted under 35 U.S.C. 154(b) by 103 days.

(21) Appl. No.: 13/273,497

(22) Filed: Oct. 14, 2011

(65) Prior Publication Data

US 2012/0097652 A1    Apr. 26, 2012

(30) Foreign Application Priority Data

Oct. 20, 2010 (IT) ............................... MI2010A1915

(51) Int. Cl.
*B23K 26/38* (2006.01)
*B23K 26/08* (2006.01)

(52) U.S. Cl.
USPC ................................ 219/121.67; 219/121.78

(58) Field of Classification Search
USPC .............. 219/121.67, 121.84, 121.78, 121.79
See application file for complete search history.

(56) References Cited

U.S. PATENT DOCUMENTS

| | | | | |
|---|---|---|---|---|
| 4,335,296 | A * | 6/1982 | Bredow | 219/121.67 |
| 5,191,188 | A * | 3/1993 | Miyajima | 219/121.83 |
| 8,440,932 | B2 * | 5/2013 | Battheu | 219/121.67 |
| 2001/0006595 | A1 | 7/2001 | Hogl et al. | |
| 2003/0051336 | A1 | 3/2003 | Helm et al. | |
| 2008/0197118 | A1 * | 8/2008 | Gattiglio et al. | 219/121.67 |
| 2009/0003952 | A1 | 1/2009 | Schmauder | |
| 2010/0271058 | A1 * | 10/2010 | Kitai et al. | 219/121.67 |

FOREIGN PATENT DOCUMENTS

| | | |
|---|---|---|
| DE | 195 25 482 | 1/1997 |
| EP | 0 491 747 B1 | 11/1993 |
| EP | 1 112 806 | 7/2001 |
| EP | 2 008 752 | 12/2008 |
| FR | 2 800 659 | 5/2001 |
| JP | 61-55708 | 3/1986 |
| JP | 63-72493 A * | 4/1988 |
| JP | 4-251687 A * | 9/1992 |
| JP | 10-244391 A * | 9/1998 |
| JP | 11-347772 A * | 12/1999 |
| JP | 2006-88214 | 4/2006 |
| JP | 2007-38286 | 2/2007 |
| JP | 2009-18334 | 1/2009 |
| WO | 91/03354 | 3/1991 |

OTHER PUBLICATIONS

European Search Report issued Jan. 11, 2012 in corresponding European Application No. 11 18 4650.

* cited by examiner

*Primary Examiner* — Geoffrey S Evans
(74) *Attorney, Agent, or Firm* — Wenderoth, Lind & Ponack, L.L.P.

(57) ABSTRACT

A combined machine for punching and laser cutting of a flat sheet metal includes a fixed base, a fixed punching head, a laser cutting head and a manipulator for the movement of the sheet metal on a Cartesian plane. The laser cutting head is carried by a variable-aperture compass structure, which is mobile along a linear guide.

5 Claims, 5 Drawing Sheets

COMBINED MACHINE FOR PUNCHING AND LASER CUTTING OF FLAT SHEET METAL

BACKGROUND OF THE INVENTION (1) Field of the Invention

The present invention relates to a combined machine for punching and laser cutting of flat sheet metal.

(2) Description of Related Art

Combined machines for punching and laser cutting of flat sheet metals are long known solutions which add—to the undoubted efficiency of individual punching and laser cutting machines—the operating flexibility of the combination of the two processes, that is a single manipulation of the sheet metal with the laser cutting replacing punching tools of complex shape. Thereby, each of the two processes, punching and laser cutting, may be best used on the sheet metal itself to be processed according to the design geometry of the piece and of the available punches.

More general architecture for an individual punching machine is the one of a fixed punching press, equipped with a tool changing device, with the sheet to be processed mobile on a Cartesian plane (XY). Contrarily, the most widespread architecture for the individual laser machine is the one with the sheet to be processed fixed and the head mobile, although solutions with fixed laser head and mobile sheet, or hybrid solutions, exist.

Combined punching and laser cutting machines are any punching machines which accommodate a laser head and not vice versa. The result is that the combined machines are at least provided with a fixed punching head, with a laser cutting head, also fixed, and with a Cartesian manipulator for the movement of the sheet metal on the plane (XY). A machine of this type is represented and described for example in EP-0491747-B1.

Furthermore, combined machines are known which are equipped with a mobile laser cutting head which allows adding the advantage of the low inertia of the motion of the laser head with respect to the inertia of the movement of the sheet. Solutions exist for the mobility of the laser head on a single axis (y) or on two orthogonal axes (xy). Obviously, the mobility of the laser heads in a single direction (y) or in the two directions (xy) makes controlling the combined motion of the laser head and of the Cartesian manipulator (XY) of the sheet metal, complex.

Combined machines with a mobile laser cutting head in a single direction (y) are described in JP-2006088214-A, JP-2007038286-A and JP-2009018334-A. The first patent shows a laser cutting head with single-directional mobility (y) in direction parallel to the one of the manipulator (Y) of the sheet metal. The second patent modifies the mobility (y) of the laser head and the design of the manipulator (XY) so as to allow the transversal through cutting of a sheet metal without interfering with the manipulator itself and its grippers. Lastly, the third patent enhances the two previous ones by adding a mechanical solution which compensates for the thermal expansion of the control screw of the movement of the laser head.

A combined machine is also known with mobility (xy) of the laser head in addition to the mobility (XY) of the manipulator of the sheet metal.

BRIEF SUMMARY OF THE INVENTION

In view of this state of the art, the object of the present invention is to make a combined machine with a fixed punching head and a mobile laser cutting head which has a different and more convenient type of mobility of the laser head.

In accordance with the invention, such an object is achieved with a combined machine for punching and laser cutting of a flat sheet metal, comprising a fixed base, a fixed punching head, a mobile laser cutting head and a manipulator for the movement of the sheet metal in a Cartesian plane (XY), characterized in that said laser cutting head is carried by a compass structure equipped with fixed-radius ($\rho$) polar mobility ($\theta$) and with a linear mobility (y).

According to a preferred embodiment, the polar-linear mobility is ensured by two independent actuators which determine the translation of the compass structure along a linear guide and the opening and closure of the compass structure itself.

The movements of the laser head may be obtained by means of rotating motors or linear motors or with screw motorizations.

The combination of the Cartesian movements of the manipulator (XY) for the mobility of the sheet metal and of the low-inertia polar-linear movements of the laser cutting head allow absolutely competitive performances and work quality to be obtained.

BRIEF DESCRIPTION OF THE DRAWINGS

Possible embodiments of a combined machine according to the present invention are shown by way of non-limiting example in the accompanying drawings, in which.

DETAILED DESCRIPTION OF THE DRAWINGS

Figure 1:
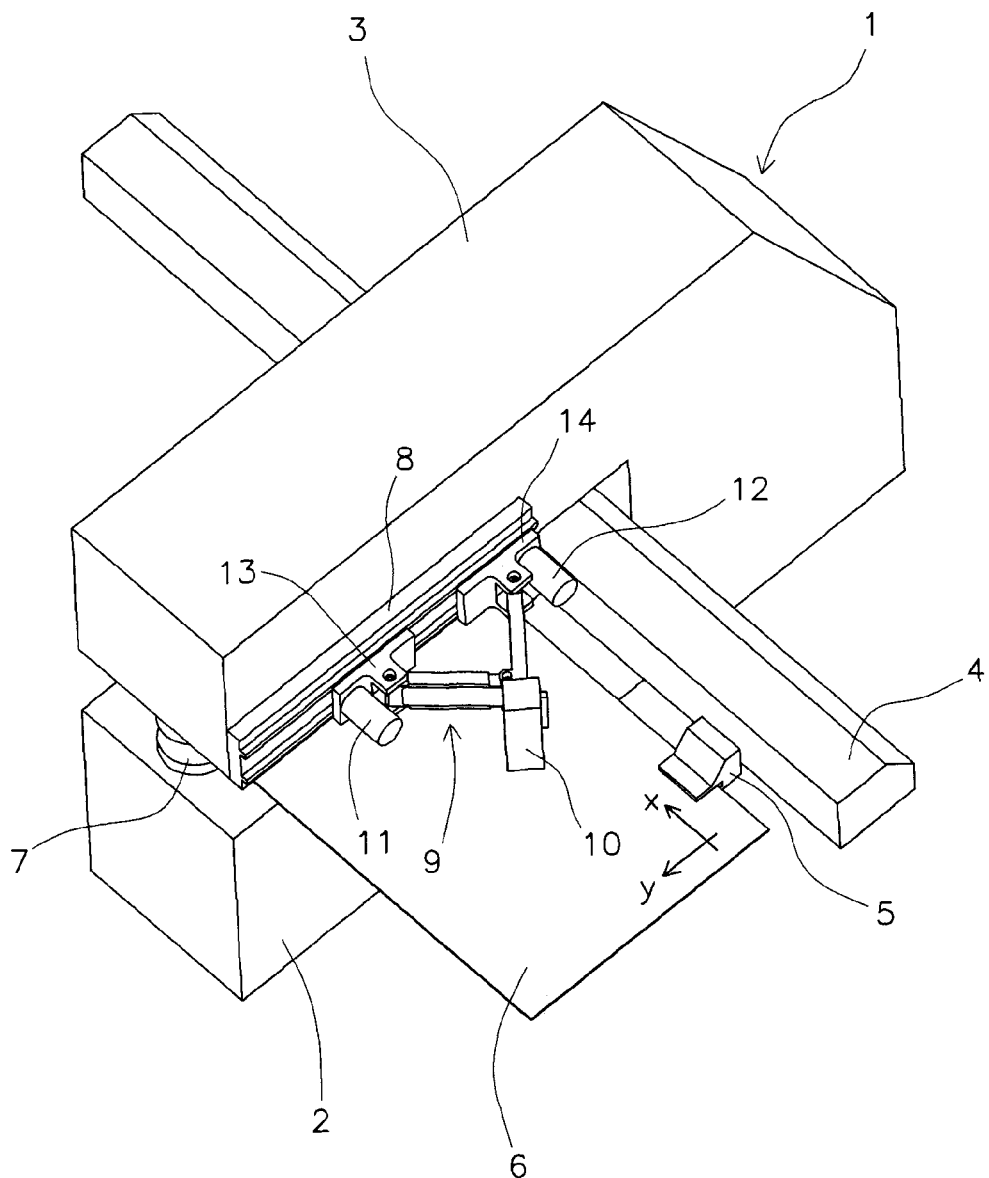
FIG. 1 shows a combined machine with rotating motors in condition of extended compass positioned in a generic point of the linear guide.
Figure 2:
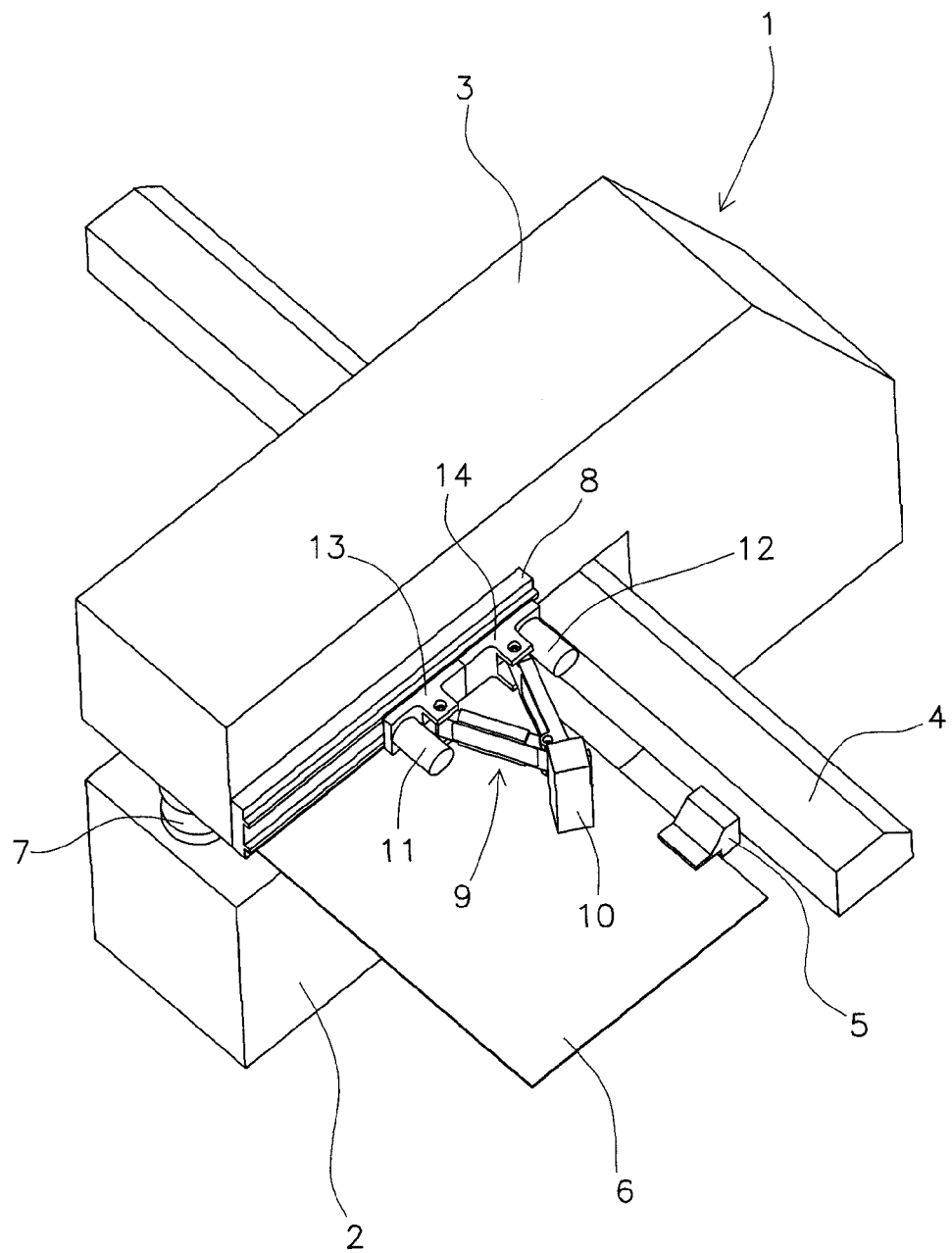
FIG. 2 shows the same machine in condition of compact compass positioned in a generic point of the linear guide.

The combined machine in FIGS. 1 and 2 comprises a fixed base 1 which has a bottom section 2 and a top section 3. In the example shown, the base is substantially C-shaped but may also be O-shaped as a closed portal.

Manipulator 4 is inserted between the two sections 2 and 3 which by means of grippers 5, supports a flat sheet metal 6 thus ensuring the controlled movement along two Cartesian axes X and Y.

The top section 3 supports a fixed punching head 7, which is conveniently equipped with a tool changing device, and a linear guide 8 for a compass structure 9 which supports a laser cutting head 10 equipped with polar-linear mobility.

The polar-linear mobility of the laser head 10 is ensured by two independent actuators, which in the case of FIGS. 1 and 2 consist of two rotating motors 11 and 12 which move two sliding pads 13 and 14 independently and at a variable reciprocal distance along the linear guide 8. Thereby, the laser head 10 may be moved along the Y axis and may rotate about a vertical axis by means of opening and closing the compass structure (FIGS. 1 and 2).

Figure 3:
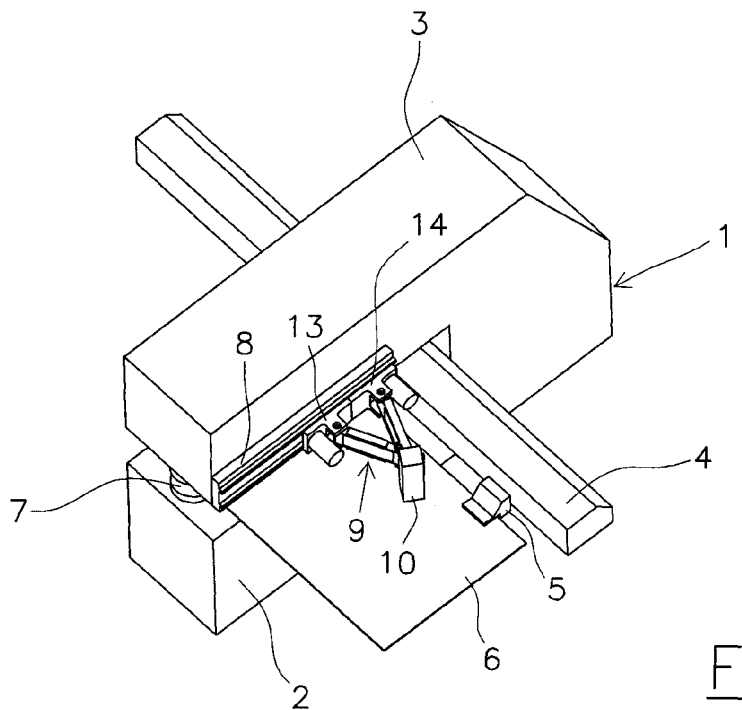
FIG. 3 shows a combined machine with linear motors in condition of compact compass positioned in a generic point of the linear guide.
Figure 4:
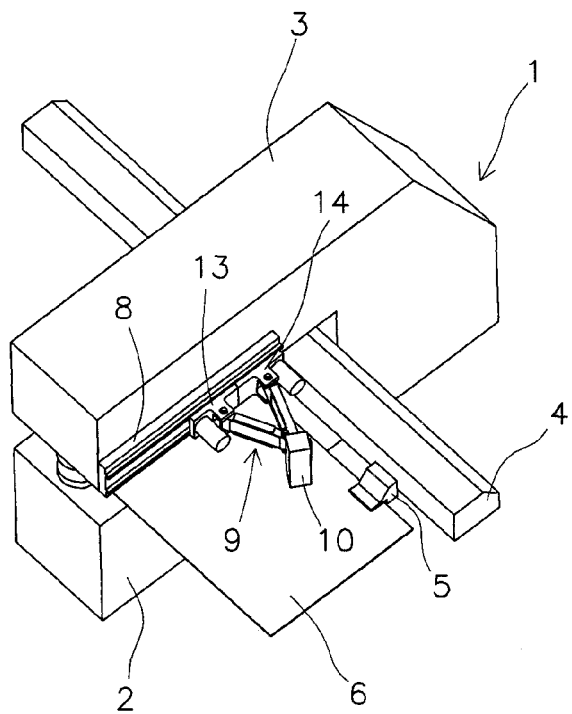
FIG. 4 shows a combined machine with screw motorization in condition of compact compass positioned in a generic point of the linear guide.

Alternatively, the actuators 11 and 12 may consist of linear motors (FIG. 3) or of screw motorizations (FIG. 4).

Figure 5:
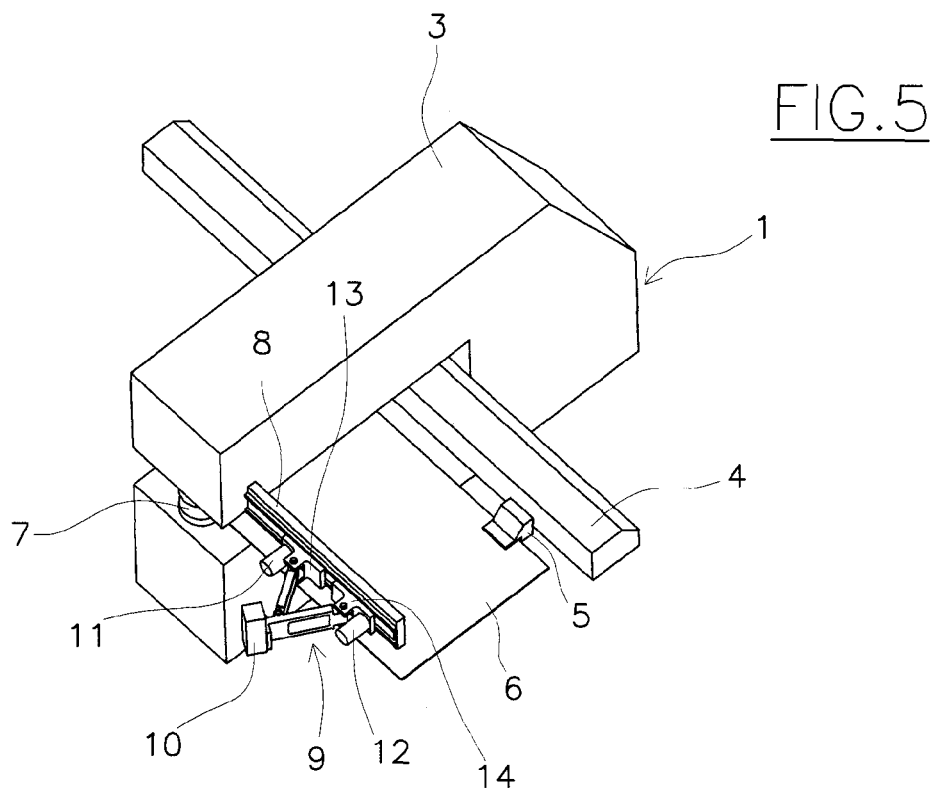
FIG. 5 shows a further variant of the combined machine according to the present invention.

As a further alternative, the linear guide 8 may be arranged perpendicular to base 1 and parallel to manipulator 4, as shown in FIG. 5.

Figure 6:
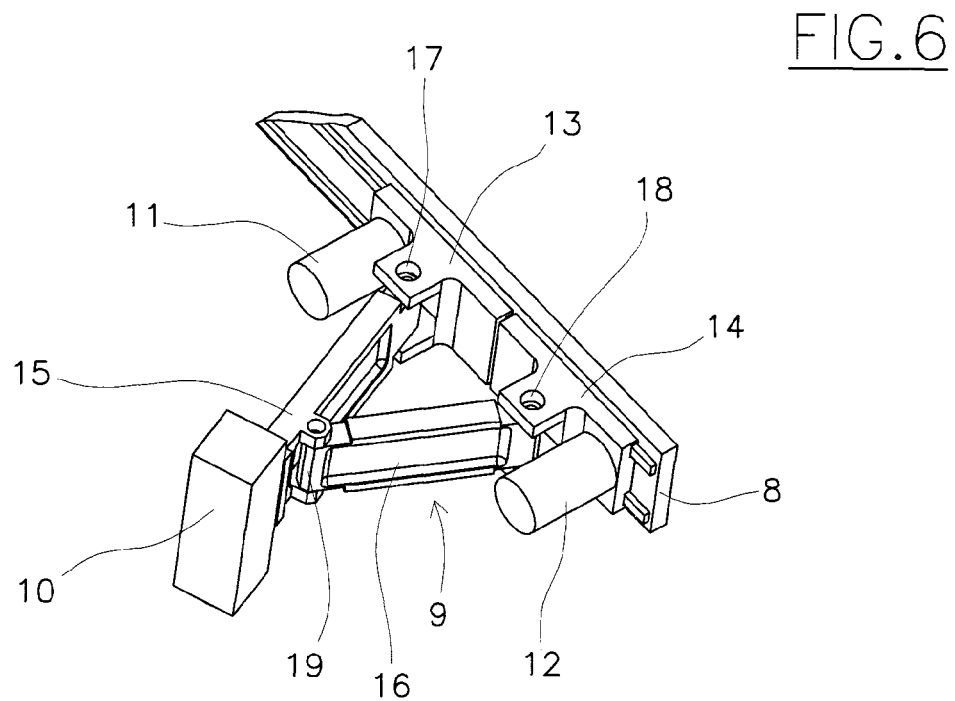
FIG. 6 shows the construction detail of an example of compass structure for supporting and moving the laser cutting head of the combined machine according to the present invention.

The compass structure 9 is better shown in FIG. 6, where the view comprises two articulated rods 15 and 16 arranged in a V, which have respective ends hinged on the respective sliding pads 13 and 14 by means of pins 17 and 18 with axes perpendicular to the plane of the sheet metal 6 and to one another by means of a further pin 19, it also being perpendicular to the plane of the sheet metal, arranged close to the other end of rod 15, where the laser cutting head 10 is fixed.

The whole formed by the linear guide 8, by the sliding pads 13 and 14, by the actuators 11 and 12 and by the articulated rods 15 and 16 allows low-inertia movements of the laser head 10 along the requested cutting profile, while manipulator 4 determines the movements of the sheet metal in the directions XY with respect to the punching head 7.

Figure 7:
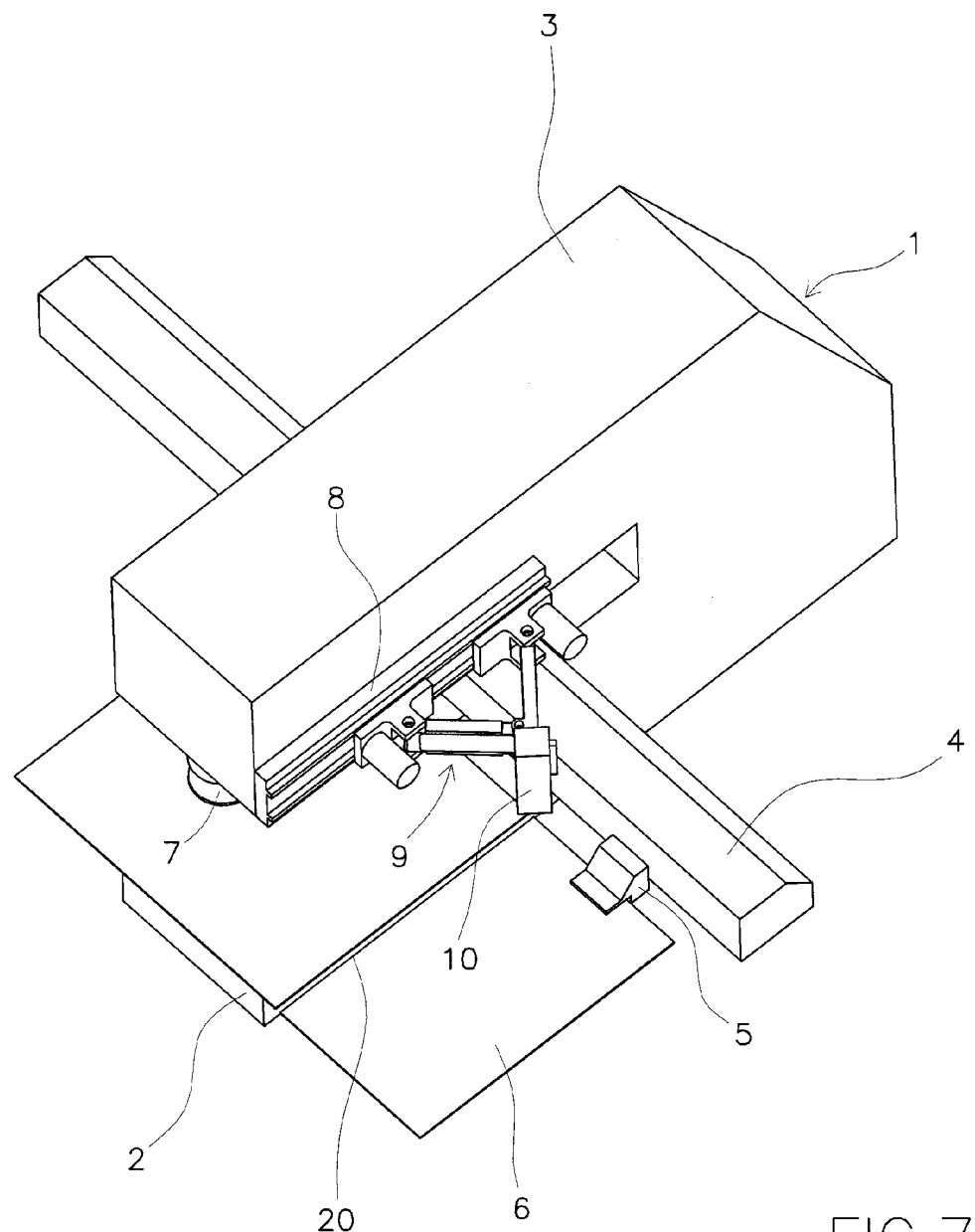
FIG. 7 shows that a combined machine according to the present invention, in particular the one in FIGS. 1 and 2, is capable of performing a complete through cut of the sheet metal without the movement of the manipulator and the mobility of the laser head interfering with each other.

As shown in FIG. 7, which refers to the embodiment in FIGS. 1 and 2, manipulator 4 of the sheet metal and the mobility of the laser head 10 are obtained so as never to interfere to each other to allow a through cut 20 from top to bottom of the sheet metal to be obtained by the laser head.

The invention claimed is:

1. A machine for punching and laser cutting of a flat sheet metal, the machine comprising:
    a fixed base;
    a linear guide fixed to a lateral side of said base and being arranged to extend in a direction parallel to the plane of the sheet metal;
    a fixed punching head;
    a mobile laser cutting head;
    a compass structure which supports said laser cutting head such that said laser cutting head can pivot about an axis perpendicular to the plane of the sheet metal, said compass structure extending laterally from said linear guide and being movable along said linear guide; and
    a manipulator for movement of the sheet metal in a Cartesian plane (XY),
    wherein said compass structure includes:
        a first sliding pad;
        a second sliding pad;
        a first rod having a first end and a second end, said first end of said first rod being pivotably connected to said first sliding pad such that said first rod is pivotable about a first axis perpendicular to the plane of the sheet metal, and said second end of said first rod being integrally fixed to said laser cutting head;
        a second rod having a first end and a second end, said first end of said second rod being pivotably connected to said first sliding pad such that said second rod is pivotable about a second axis perpendicular to the plane of the sheet metal, and said second end of said second rod being pivotably connected to said second end of said first rod such that said second rod is pivotable relative to said first rod about a third axis perpendicular to the plane of the sheet metal;
        a first actuator which drives said first sliding pad along said linear guide; and
        a second actuator which drives said second sliding pad along said linear guide,
        wherein said first rod and said second rod are arranged to form a V-shape for articulated connection of said first sliding pad and said second sliding pad to said laser cutting head, and
        wherein the first actuator moves the first sliding pad independently of the second sliding pad, and the second actuator moves the second sliding pad independently of the first sliding pad.

2. The machine of claim 1, wherein said first actuator and said second actuator are rotary motors.

3. The machine of claim 1, wherein said first actuator and said second actuator are linear motors.

4. The machine of claim 1, wherein said first actuator and said second actuator are screw actuators.

5. The machine of claim 1, wherein said manipulator and the mobility of said laser cutting head are configured and arranged so that they do not interfere with each other in order to allow a complete passing-through cutting of the sheet metal.

* * * * *